(12) United States Patent
Cooper

(10) Patent No.: US 11,164,453 B1
(45) Date of Patent: Nov. 2, 2021

(54) TRAFFIC SIGNAL CONTROL SYSTEM AND APPLICATION THEREFOR

(71) Applicant: Grant Stanton Cooper, Esparto, CA (US)

(72) Inventor: Grant Stanton Cooper, Esparto, CA (US)

( * ) Notice: Subject to any disclaimer, the term of this patent is extended or adjusted under 35 U.S.C. 154(b) by 0 days.

(21) Appl. No.: 17/007,680

(22) Filed: Aug. 31, 2020

(51) Int. Cl.
| *G08G 1/083* | (2006.01) |
| *G08G 1/08* | (2006.01) |
| *G08G 1/01* | (2006.01) |
| *G01S 13/91* | (2006.01) |
| *G06K 9/00* | (2006.01) |
| *G08G 1/04* | (2006.01) |

(52) U.S. Cl.
CPC .............. *G08G 1/08* (2013.01); *G01S 13/91* (2013.01); *G06K 9/00785* (2013.01); *G08G 1/0145* (2013.01); *G08G 1/04* (2013.01); *G08G 1/083* (2013.01); *G06K 2209/23* (2013.01)

(58) Field of Classification Search
CPC .......... G08G 1/08; G08G 1/0145; G08G 1/04; G08G 1/083; G01S 13/91; G06K 9/00785; G06K 2209/23
See application file for complete search history.

(56) References Cited

U.S. PATENT DOCUMENTS

| 5,444,442 | A | * | 8/1995 | Sadakata | ................... | G08G 1/08 |
|   |   |   |   |   |   | 340/916 |
| 5,509,082 | A | * | 4/1996 | Toyama | .................... | G08G 1/04 |
|   |   |   |   |   |   | 340/917 |
| 5,530,441 | A | * | 6/1996 | Takatou | .................... | G08G 1/08 |
|   |   |   |   |   |   | 340/937 |
| 6,937,161 | B2 | * | 8/2005 | Nishimura | ............... | G08G 1/08 |
|   |   |   |   |   |   | 340/916 |

(Continued)

*Primary Examiner* — Nay Tun
(74) *Attorney, Agent, or Firm* — The Iwashko Law Firm, PLLC; Lev Ivan Gabriel Iwashko

(57) ABSTRACT

A traffic signal control system having a program running thereon to monitor and control operations of a traffic light at a road intersection, the traffic signal control system including a storage device to store traffic data regarding a flow of traffic around the traffic light, at least one traffic signal controller to execute the program to adjust a setting of the traffic light based on the traffic data received from the storage device for a heavy traffic street with a plurality of vehicles thereon, such that the at least one traffic signal controller performs at least one of adjusting a red light to a green light and keeping the green light for a predetermined period of time, and at least one traffic management device to execute the program to manage the at least one traffic signal controller and the traffic data received from the storage device. The traffic signal control system may further include at least one of at least one camera, at least one sensor, and at least one radar to count a number of the plurality of vehicles moving around the road intersection in real time. The at least one traffic signal controller may communicate to (Continued)

another at least one traffic signal controller to adjust the setting of another traffic light in response to the count of the number of the plurality of vehicles, such that the another at least one traffic signal controller performs at least one of adjusting a red light to a green light and keeping the green light for another predetermined period of time.

20 Claims, 3 Drawing Sheets

(56) References Cited

U.S. PATENT DOCUMENTS

| | | | | |
|---|---|---|---|---|
| 7,973,675 B2* | 7/2011 | Glatfelter | ............... | G08G 1/01 340/907 |
| 8,018,352 B2* | 9/2011 | Shillman | ............... | G08G 1/095 340/937 |
| 8,825,350 B1* | 9/2014 | Robinson | ........... | G06K 9/00785 701/117 |
| 9,633,560 B1* | 4/2017 | Gao | ..................... | G08G 1/0145 |
| 9,761,131 B2* | 9/2017 | Robinson | ........... | G06K 9/00785 |
| 9,830,813 B2* | 11/2017 | Smith | ..................... | G08G 1/08 |
| 9,922,556 B2* | 3/2018 | Peri | ......................... | G08G 1/08 |
| 10,019,898 B2* | 7/2018 | Miller | ..................... | G08G 1/08 |
| 10,037,693 B2* | 7/2018 | Ryu | ........................ | G08G 1/08 |
| 10,176,711 B2* | 1/2019 | Kelly | ..................... | G08G 1/083 |
| 10,217,357 B1* | 2/2019 | Elsheemy | ........... | G08G 1/09623 |
| 10,249,183 B2* | 4/2019 | Umehara | .............. | G08G 1/0133 |
| 10,650,673 B1* | 5/2020 | Elsheemy | ............. | G08G 1/081 |
| 2007/0273552 A1* | 11/2007 | Tischer | .................. | G08G 1/081 340/910 |
| 2008/0094250 A1* | 4/2008 | Myr | ........................ | G08G 1/04 340/909 |
| 2010/0321210 A1* | 12/2010 | Lee | ........................ | G08G 1/081 340/917 |
| 2011/0205086 A1* | 8/2011 | Lamprecht | ............. | G08G 1/087 340/928 |
| 2012/0038490 A1* | 2/2012 | Verfuerth | ............. | G08G 1/0133 340/910 |
| 2013/0300583 A1* | 11/2013 | Wignot | ................... | G01S 13/91 340/907 |
| 2016/0027299 A1* | 1/2016 | Raamot | ............... | G08G 1/0145 340/917 |
| 2017/0032669 A1* | 2/2017 | Wu | ......................... | G08G 1/0133 |
| 2018/0096595 A1* | 4/2018 | Janzen | ................ | G06K 9/0063 |
| 2018/0190111 A1* | 7/2018 | Green | .................. | G08G 1/0145 |
| 2019/0050647 A1* | 2/2019 | Malkes | .............. | G06K 9/00785 |
| 2019/0051152 A1* | 2/2019 | Malkes | ..................... | G08G 1/08 |
| 2019/0051160 A1* | 2/2019 | Malkes | ................ | G08G 1/0145 |
| 2019/0122546 A1* | 4/2019 | Lu | .......................... | G08G 1/056 |
| 2019/0259282 A1* | 8/2019 | Ji | ......................... | G08G 1/0133 |
| 2020/0211381 A1* | 7/2020 | Tonguz | ............... | G08G 1/0145 |

* cited by examiner

TRAFFIC SIGNAL CONTROL SYSTEM AND APPLICATION THEREFOR

BACKGROUND

1. Field

The present general inventive concept relates generally to a control system, and particularly, to a traffic signal control system.

2. Description of the Related Art

For most people, the most common vehicle used for transportation on a personal basis is a car, a truck, and/or a van (collectively, referred to as a car). The car facilitates transportation to most places people need to go, such as an office for work, a store, a gas station, a bank, and/or any other location people need for typical day-to-day living.

Moreover, while driving, people will encounter a traffic sign and/or a traffic light (a.k.a. a traffic signal). In particular, the traffic light is an automated traffic control system used to control the flow of traffic in a designated location. Generally, the traffic light is located at a road intersection, a pedestrian crossing, a railroad crossing, and/or any other location where the flow of traffic requires control to avoid an accident.

Currently, the traffic light is controlled by a controller that changes the traffic light based on a predetermined duration of time. The predetermined duration of time is often based on studies of traffic patterns at a given location, which can also be adjusted based on a time of day (e.g., morning, afternoon, evening, etc.). Additionally, the traffic light can be connected to a camera that monitors vehicles including headlights moving at the given location. However, the traffic light is limited in controlling traffic due to changing the traffic light based on the predetermined duration of time. As such, some intersections are heavily prone to a traffic bottleneck where one street has more vehicles traveling than a cross street. Unsurprisingly, the traffic bottleneck is an inefficient means of controlling the traffic because the vehicles on the street with more traffic may wait for several minutes while the cross street has only one car, or none at all.

The traffic light controlled by the controller using the predetermined duration of time can result in lost opportunities and revenue for businesses and people traveling on the road.

Therefore, there is a need for a traffic signal control system that facilitates movement of traffic on more heavily traveled streets and to prevent the traffic bottleneck.

SUMMARY

The present general inventive concept provides a traffic signal control system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a traffic signal control system having a program running thereon to monitor and control operations of a traffic light at a road intersection, the traffic signal control system including a storage device to store traffic data regarding a flow of traffic around the traffic light, at least one traffic signal controller to execute the program to adjust a setting of the traffic light based on the traffic data received from the storage device for a heavy traffic street with a plurality of vehicles thereon, such that the at least one traffic signal controller performs at least one of adjusting a red light to a green light and keeping the green light for a predetermined period of time, and at least one traffic management device to execute the program to manage the at least one traffic signal controller and the traffic data received from the storage device.

The storage device stores the traffic data to include at least one of traffic density, speed of the traffic, location of the at least one traffic signal controller, and operation status of the at least one traffic signal controller.

The traffic signal control system may further include at least one camera disposed on the traffic light and connected to at least one of the storage device, the at least one traffic signal controller, and the at least one traffic management device to monitor the flow of traffic within the road intersection.

The at least one camera may be oriented in a direction of at least one street connected to the road intersection.

The at least one traffic signal controller may extend the predetermined period of time in response to the at least one camera identifying the plurality of vehicles on the at least one street approaching the traffic light.

The at least one camera may count a number of the plurality of vehicles moving around the road intersection in real time.

The at least one traffic signal controller may communicate to another at least one traffic signal controller to adjust the setting of another traffic light in response to the count of the number of the plurality of vehicles from the at least one camera, such that the another at least one traffic signal controller performs at least one of adjusting a red light to a green light and keeping the green light for another predetermined period of time.

The traffic signal control system may further include at least one sensor disposed on at least a portion of at least one street between the road intersection and another road intersection and connected to at least one of the storage device, the at least one traffic signal controller, and the at least one traffic management device to monitor the flow of traffic within the road intersection.

The at least one traffic signal controller may adjust the predetermined period of time in response to the at least one sensor identifying the plurality of vehicles on the at least one street waiting at the traffic light.

The at least one traffic sensor may count a number of the plurality of vehicles moving around the road intersection in real time.

The at least one traffic signal controller may communicate to another at least one traffic signal controller to adjust the setting of another traffic light in response to the count of the number of the plurality of vehicles from the at least one sensor, such that the another at least one traffic signal controller performs at least one of adjusting a red light to a green light and keeping the green light for another predetermined period of time.

The traffic signal control system may further include at least one radar disposed on the traffic light and connected to at least one of the storage device, the at least one traffic signal controller, and the at least one traffic management device to monitor the flow of traffic within the road intersection.

The at least one radar may be oriented in a direction of at least one street connected to the road intersection.

The at least one traffic signal controller may extend the predetermined period of time in response to the at least one radar identifying the plurality of vehicles on the at least one street approaching the traffic light.

The at least one radar may count a number of the plurality of vehicles moving around the road intersection in real time.

The at least one traffic signal controller may communicate to another at least one traffic signal controller to adjust the setting of another traffic light in response to the count of the number of the plurality of vehicles from the at least one radar, such that the another at least one traffic signal controller performs at least one of adjusting a red light to a green light and keeping the green light for another predetermined period of time.

The at least one traffic signal controller may adjust the setting of the traffic light in response to less than two vehicles being on a cross street.

The at least one traffic management device may set up automated responses to the traffic data received from the at least one traffic signal controller.

The traffic management device may set up at least one of the automated responses to increase the predetermined period of time the plurality of vehicles on the heavy traffic street may move through the road intersection by adjusting the setting of the at least one traffic signal controller.

The at least one traffic signal controller may adjust the setting of the traffic light by adjusting the traffic light from the green light to the red light in response to a low number of the plurality of vehicles waiting on the heavy traffic street.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
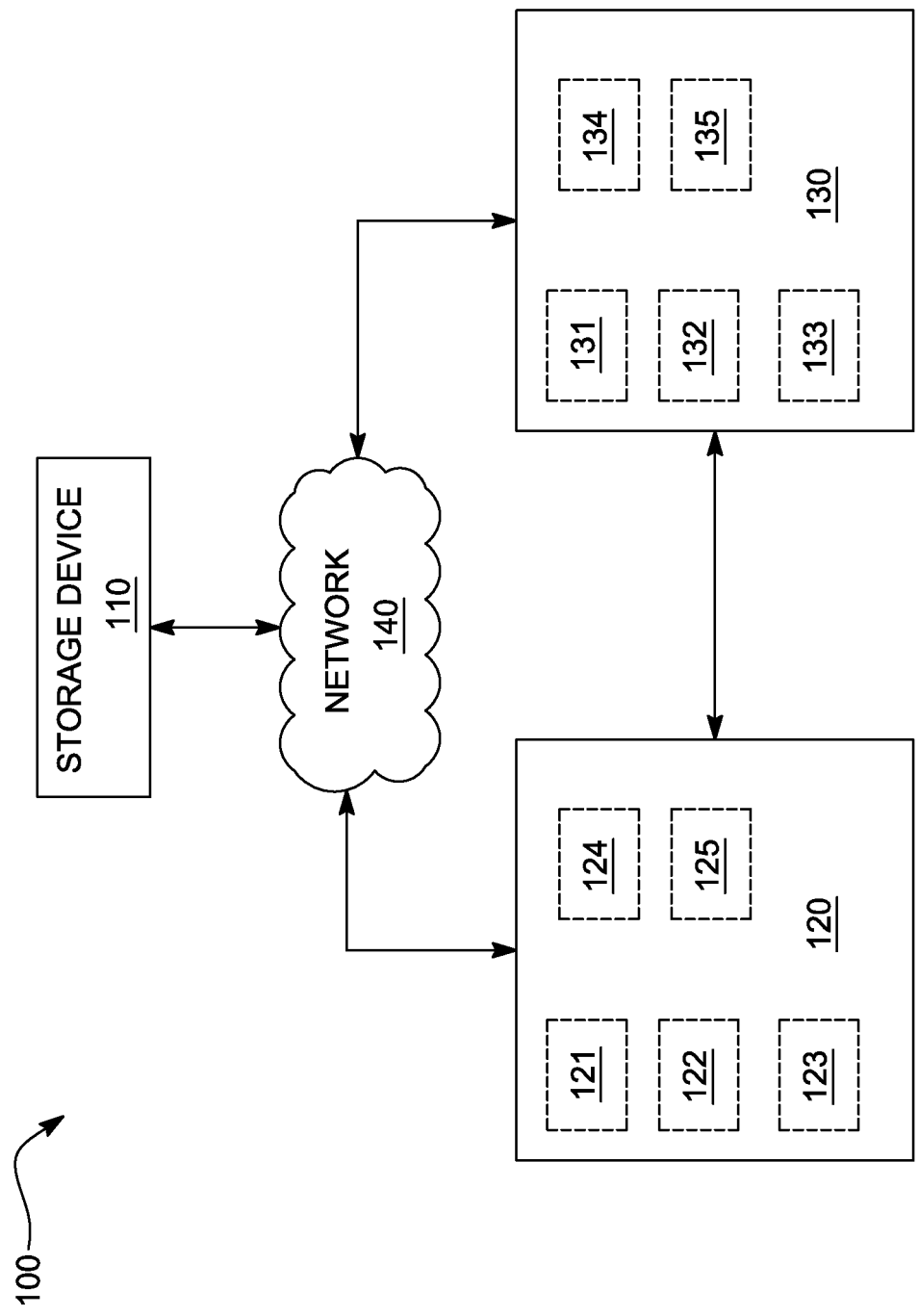
FIG. 1 illustrates a block diagram of a traffic signal control system, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Traffic Signal Control System 100
Storage Device 110
Traffic Signal Controller 120
Input Unit 121
Display Unit 122
Processing Unit 123
Communications Unit 124
Storage Unit 125
Traffic Management Device 130
Input Unit 131
Display Unit 132
Processing Unit 133
Communications Unit 134
Storage Unit 135
Network 140
Camera 150
Sensor 160
Radar 170

FIG. 1 illustrates a block diagram of a traffic signal control system 100, according to an exemplary embodiment of the present general inventive concept.

Figure 2:
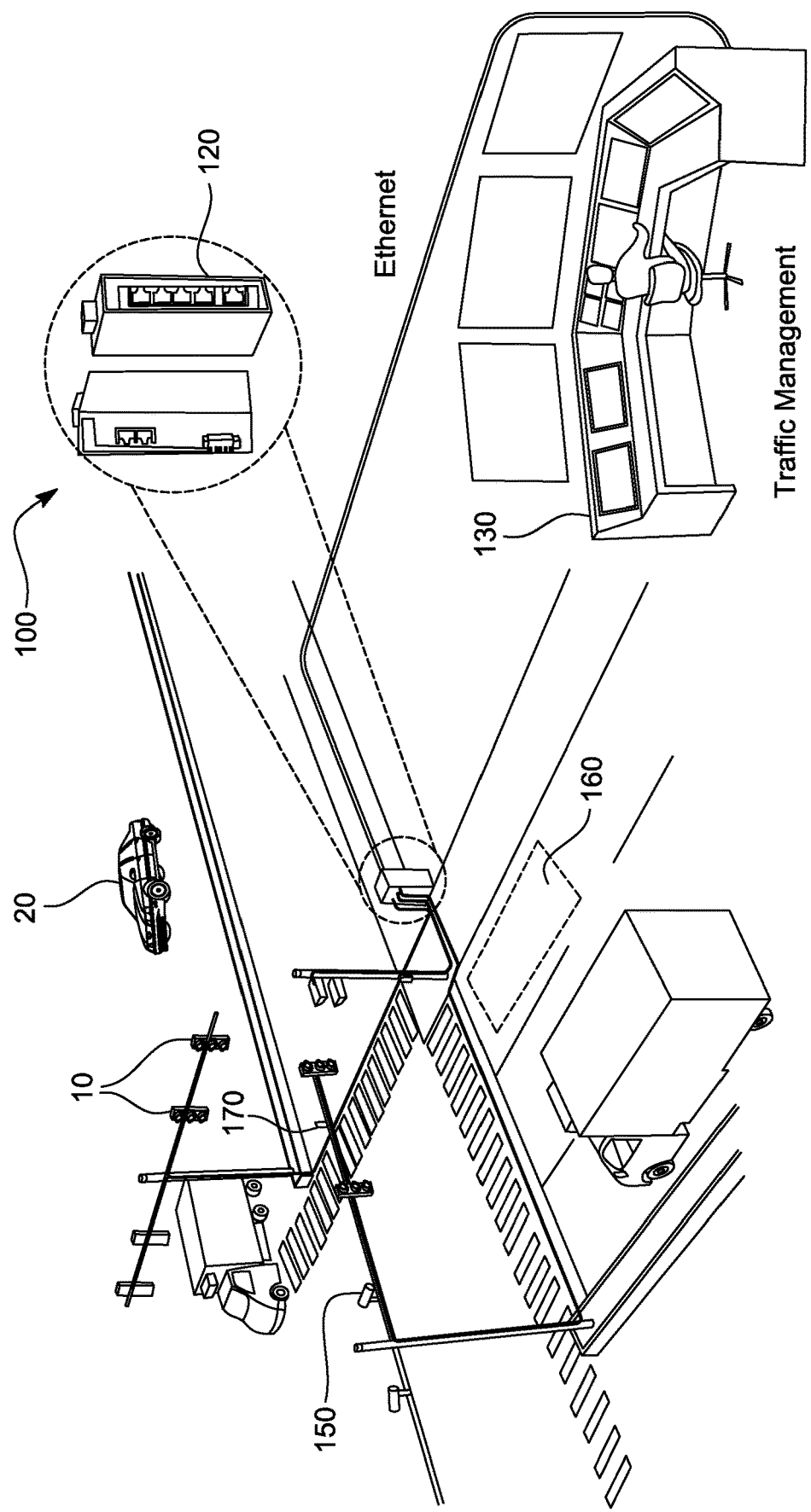
FIG. 2 illustrates an isometric view of the traffic signal control system connected to a traffic light including zoomed in views of at least one traffic signal controller and at least one traffic management device, according to an exemplary embodiment of the present general inventive concept.

FIG. 2 illustrates an isometric view of the traffic signal control system 100 connected to a traffic light 10 including zoomed in views of at least one traffic signal controller 120 and at least one traffic management device 130, according to an exemplary embodiment of the present general inventive concept.

The traffic signal control system 100 may include a storage device 110, at least one traffic signal controller 120, at least one traffic management device 130, a network 140, a camera 150, a sensor 160, and a radar 170, but is not limited thereto.

Herein, the at least one traffic signal controller 120 may be connected to and communicate with the storage device 110 and/or the at least one traffic management device 130, via a mobile and/or a software application. Conversely, the at least one traffic management device 130 may track and/or monitor the at least one traffic signal controller 120, via the mobile and/or the software application.

The storage device 110 may include a server, a computing device with a storage unit, and a cloud-based storage space, but is not limited thereto. The storage device 110 may store traffic data that includes at least one of traffic density, speed of traffic, location of the at least one traffic signal controller 120, location of at least one camera 150, location of at least one sensor 160, location of at least one radar 170, operation status of the least one traffic signal controller 120, operation status of the at least one camera 150, operation status of the at least one sensor 160, operation status of the at least one radar 170, time, date, weather condition, traffic incidents, and/or any other information pertaining to the traffic data monitored by the at least one traffic signal controller 120.

Figure 3:
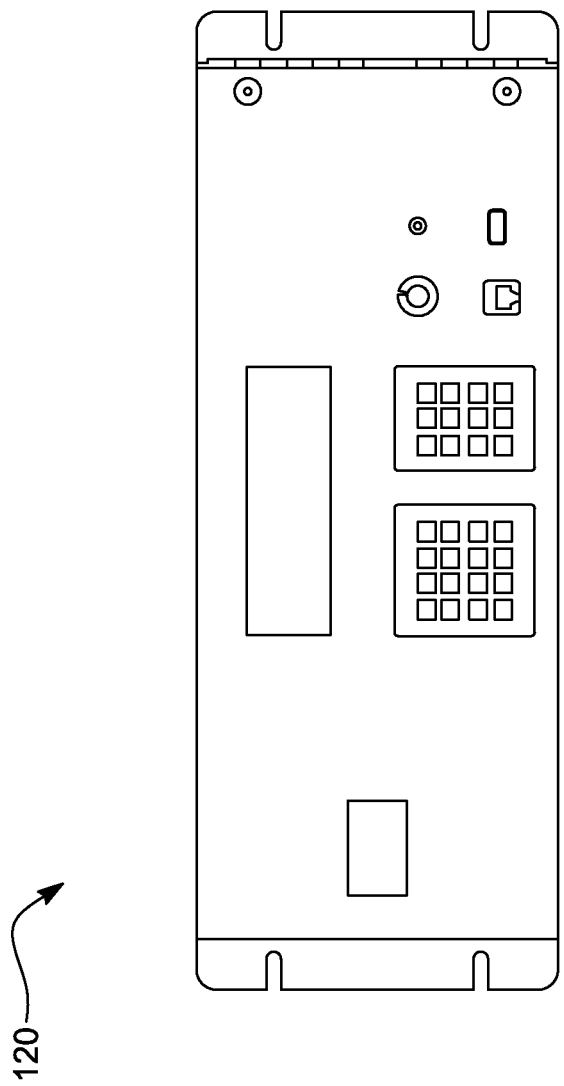
FIG. 3 illustrates a front elevation view of the at least one traffic signal controller, according to an exemplary embodiment of the present general inventive concept.

FIG. 3 illustrates a front elevation view of the at least one traffic signal controller 120, according to an exemplary embodiment of the present general inventive concept.

The at least one traffic signal controller 120 may include an input unit 121, a display unit 122, a processing unit 123, a communication unit 124, and a storage unit 125, but is not limited thereto.

The input unit 121 may include a keyboard, a touchpad, a mouse, a trackball, a stylus, a voice recognition unit, a visual data reader, a camera, a wireless device reader, and a holographic input unit.

The display unit 122 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 122 may be combined with the input unit 121 to be a touch-screen.

The processing unit 123 (or central processing unit, CPU) may include electronic circuitry to carry out instructions of a computer program by performing basic arithmetic, logical, control and input/output (I/O) operations specified by the instructions. The processing unit 123 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 123 may also include a microprocessor and a microcontroller.

The communication unit 124 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 125 may include a random access memory (RAM), a read-only memory (ROM), a hard disk, a flash drive, a database connected to the Internet, cloud-based storage, Internet-based storage, or any other type of storage unit.

The at least one traffic signal controller 120 may access the Internet via the communication unit 124 to allow at least one user to access a website, and/or may allow the mobile and/or the software application to be executed using the processing unit 123. For ease of description, the mobile and/or the software application will be hereinafter referred to as an app. The app may be downloaded from the Internet and/or installed via a computer readable medium to be stored on the storage unit 125.

The at least one traffic signal controller 120 may use the app to control and/or adjust a setting of a traffic light 10. More specifically, the input unit 121 may receive a setting input to adjust the setting of the traffic light 10 based on the traffic data received from the storage device 110. Additionally, the processing unit 123 of the at least one traffic signal controller 120 may execute instructions from the app to monitor a flow of traffic of at least one vehicle 20 at a road intersection, a pedestrian crossing, and/or a railroad crossing. Moreover, the processing unit 123 of the at least one traffic signal controller 120 may execute instructions from the app to control the traffic light 10 to change a signal (e.g., red, yellow, green) based on a heavy traffic street (i.e. a first street at the road intersection that has more traffic than a second street and/or a cross street) with respect to the cross street. In other words, the heavy traffic street may have a plurality of vehicles 20 that frequently travel on that street compared to the second street and/or the cross street, such as when the cross street may have only one or no vehicles 20 thereon at the road intersection.

Also, the heavy traffic street may refer to at least one first street at a first road intersection and/or at least one second street at a second road intersection that may be the same as the first street or a different street with respect to the first street. In other words, the heavy traffic street at the first road intersection may have the plurality of vehicles 20 traveling in a different direction with respect to the heavy traffic street at the second road intersection.

The at least one traffic management device 130 may include an input unit 131, a display unit 132, a processing unit 133, a communication unit 134, and a storage unit 135, but is not limited thereto.

The input unit 131 may include a keyboard, a touchpad, a mouse, a trackball, a stylus, a voice recognition unit, a visual data reader, a camera, a wireless device reader, and a holographic input unit.

The display unit 132 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 132 may be combined with the input unit 131 to be a touch-screen.

The processing unit 133 (or central processing unit, CPU) may include electronic circuitry to carry out instructions of a computer program by performing basic arithmetic, logical, control and input/output (I/O) operations specified by the instructions. The processing unit 133 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 133 may also include a microprocessor and a microcontroller.

The communication unit 134 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 135 may include a random access memory (RAM), a read-only memory (ROM), a hard disk, a flash drive, a database connected to the Internet, cloud-based storage, Internet-based storage, or any other type of storage unit.

The at least one traffic management device 130 may access the Internet via the communication unit 134 to allow at least operator to access the app, as described above, to be executed using the processing unit 133. The app may be downloaded from the Internet and/or installed via a computer readable medium to be stored on the storage unit 135. The at least one traffic management device 130 may use the app to allow the at least one operator to manage the at least one traffic signal controller 120.

More specifically, the processing unit 133 of the at least one traffic management device 130 may execute instructions from the app to set up automated responses of the at least one traffic signal controller 120, operation status of the at least one traffic signal controller 120, maps, the traffic data received from the storage device 110 via the communication unit 134, the traffic data received from the at least one camera 150 via the communication unit 134, the traffic data received from the at least one sensor 160 via the communication unit 134, the traffic data received from the at least one radar 170 via the communication unit 134, For example, the processing unit 133 of the at least one traffic management device 130 may execute instructions from the app to create the automated responses of the at least one traffic signal controller 120 based on the flow of traffic of the at least one vehicle 20 at the road intersection by comparing the heavy traffic street to the cross street. In other words, the processing unit 133 of the at least one traffic management device 130 may execute instructions from the app to increase a duration of time the heavy traffic street may move through the road intersection via the at least one traffic signal controller 120, such as when ten vehicles are moving on the heavy traffic street compared to one vehicle or no vehicles are moving and/or waiting at the traffic light 10 on the cross street.

Furthermore, the processing unit 133 of the at least one traffic management device 130 may execute instructions from the app to provide a graphic interface showing a dashboard and/or a summary using the maps and/or a list of the traffic data.

Referring to FIG. 1, the network 140 may be at least one of the Internet, a cellular network, a universal mobile telecommunications systems (UMTS) network, a Long Term Evolution (LTE) network, a Global System for Mobile Communications (GSM) network, a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. The network 140 can be implemented with any number of hardware and software components, transmission media, and network protocols. FIG. 1 illustrates the network 140 as a single network, but is not limited thereto.

The at least one traffic signal controller 120 and/or the at least one traffic management device 130 can both can send data to, and receive data from, the storage device 110 over the Internet or any of the above-mentioned networks. The at least one traffic signal controller 120 and/or the at least one traffic management device 130 can be directly coupled to the storage device 110. Alternatively, the at least one traffic signal controller 120 and/or the at least one traffic management device 130 can be connected to the storage device 110 via any other suitable device, communication network, or combination thereof. For example, the at least one traffic signal controller 120 can be coupled to the storage device 110 via routers, switches, access points, and/or communication networks. In other words, the storage device 110, the at least one traffic signal controller 120, and the at least one traffic management device 130 may all communicate with each other via the network 140.

Furthermore, any new data input and/or stored on the storage device 110, the storage unit 125 of the at least one traffic signal controller 120, and/or the storage unit 135 of the at least one traffic management device 130 may be periodically transmitted to each other component and/or apparatus of the traffic signal control system 100, such that the each other component and/or apparatus may be updated. In other words, the storage device 110, the storage unit 125 of the at least one traffic signal controller 120, and/or the storage unit 135 of the at least one traffic management device 130 may synchronize to keep the app and/or data updated.

The at least one camera 150 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

Also, the at least one camera 150 may preferably have capabilities to send data therefrom via the network 140 to the storage device 110, the at least one traffic signal controller 120, and/or the at least one traffic management device 130.

The moving images and/or still images may be saved and stored within the storage device 110 as any type of file, including, but not limited to, .OGG, .MP4, .M4P, .M4V, .AVI, .MPG, .MP2, .MPEG, .MPE, .MPV, .WEBM, .3GP, .ASF, .JPG, .GIF, TIFF, PNG, Raw Image Files, Flash Video Format, QUICKTIME, and WINDOWS Media Video Format.

Furthermore, any of the above file types (i.e., the recorded data) may be sent via the network 140 to the storage device 110, the at least one traffic signal controller 120, and/or the at least one traffic management device 130.

Referring to FIG. 2, the at least one camera 150 is illustrated to be disposed on at least a portion of the traffic light 10. However, the at least one camera 150 may be disposed at any location to capture the moving images and/or the still images including the at least one vehicle 20 within the road intersection and/or on any street.

The at least one camera 150 may communicate with and/or be connected to the at least one traffic signal controller 120 and/or the at least one traffic management device 130. The at least one camera 150 may monitor the flow of traffic within and/or around the road intersection, such that the processing unit 123 of the at least one traffic signal controller 120 executing the app may determine the flow of traffic on the heavy traffic street. As such, preferably, the at least one camera 150 may be oriented (i.e. facing) in a direction, such as toward the heavy traffic street, the road intersection, and/or any other street (i.e. at least one street connected to the road intersection) to detect the at least one vehicle 20 therein, such that the processing unit 123 of the at least one traffic signal controller 120 executing the app may extend the duration of time of the at least one vehicle 20 on the heavy traffic street may move through the road intersection by keeping the traffic light 10 green. In other words, the processing unit 123 of the at least one traffic signal controller 120 executing the app may reduce a traffic bottleneck of the plurality of vehicles 20 on the heavy traffic street by facilitating movement by the plurality of vehicles 20 on the heavy traffic street through the road intersection in response to the at least one camera 150 monitoring and/or identifying the plurality of vehicles 20 approaching and/or moving through the road intersection.

Furthermore, the processing unit 123 of the at least one traffic signal controller 120 executing the app may calculate a hold time for the cross street based on a predetermined hold time in response to at least one other vehicle 20 approaching and/or waiting at the road intersection on the cross street. As such, the processing unit 123 of the at least one traffic signal controller 120 executing the app may change a light signal (e.g., from green light to red light) on the traffic light 10 in response to the hold time exceeding the predetermined hold time and/or the flow of traffic on the heavy traffic street has decreased, such that the traffic bottleneck (e.g., more than four cars) may not occur on the heavy traffic street. In other words, the at least one traffic signal controller 120 may adjust the traffic light 10 from green to red and/or keep the traffic light 10 red for a predetermined period of time on the heavy traffic street in response to detecting the approach and/or waiting of a low number of the plurality of vehicles 20 at the road intersection using the at least one camera 150, such as less than four cars.

Also, the processing unit 123 of the at least one traffic signal controller 120 executing the app may use the at least one camera 150 to count a number of the plurality of vehicles 20 moving toward, within, and/or away from the road intersection. The processing unit 123 may store the count of the number of the plurality of vehicles 20 on the storage unit 125, as well as send the count of the number of the plurality of vehicles 20 to the storage device 110, another at least one traffic signal controller 120, and/or the at least one traffic management device 130.

As such, the at least one traffic signal controller 120 may communicate to the another at least one traffic signal controller 120 to adjust another traffic light 10 from red to green and/or keep the another traffic light 10 green for another predetermined period of time to facilitate movement along the heavy traffic street. In other words, multiple intersections along the heavy traffic street that include traffic lights 10 may allow the plurality of cars 20 moving thereon to continue moving. Therefore, the at least one traffic signal controller 120 and/or the at least one traffic management device 130 may update the light signal of the traffic light 10 in real time, such that the plurality of vehicles 20 on the heavy traffic street may continue moving.

The at least one sensor 160 may include any type of sensor known to one of ordinary skill in the art, including, but not limited to, a motion sensor, a vibration sensor, a tactile sensor, an accelerometer-type sensor, a pressure sensor, a proximity sensor, a passive infrared sensor, a microwave sensor, an ultrasonic sensor, a laser detector, an emission sensor, a spatial sensor, and a temperature sensor, but is not limited thereto.

Referring again to FIG. 2, the at least one sensor 160 is illustrated to be disposed on at least a portion of a ground surface near the traffic light 10 (e.g., at least a portion of the ground surface before a crosswalk and/or a line marking a wait area for the plurality of vehicles 20 during a red light). However, the at least one sensor 160 may be disposed at any location, such as within the road intersection, on a street sign, a street light, on a drone, on a vehicle, a manhole cover, on a plant, a telephone pole, and/or along any street between the road intersection and another road intersection to detect a presence and/or a movement of the at least one vehicle 20 within a predetermined distance (e.g. fifty feet) of the road intersection.

The at least one sensor 160 may communicate with and/or be connected to the at least one traffic signal controller 120 and/or the at least one traffic management device 130. The at least one sensor 160 may monitor the flow of traffic within the road intersection, such that the processing unit 123 of the at least one traffic signal controller 120 executing the app may determine the flow of traffic on the heavy traffic street, and/or the processing unit 133 of the at least one traffic management device 130 may determine the flow of traffic on the cross street. As such, the at least one sensor 160 may detect the flow of traffic, such that the processing unit 123 of the at least one traffic signal controller 120 executing the app may adjust the duration of time the at least one vehicle 20 on the heavy traffic street may move through the road intersection by keeping the traffic light 10 green. In other words, the processing unit 123 of the at least one traffic signal controller 120 executing the app may reduce the traffic bottleneck of the plurality of vehicles 20 on the heavy traffic street by facilitating movement through the road intersection in response to the at least one sensor 160 monitoring and/or identifying the plurality of vehicles 20 approaching and/or moving through the road intersection.

Furthermore, the processing unit 123 of the at least one traffic signal controller 120 executing the app may calculate the hold time for the cross street based on the predetermined hold time in response to the at least one other vehicle 20 approaching and/or waiting at the road intersection on the cross street. As such, the processing unit 123 of the at least one traffic signal controller 120 executing the app may change the light signal on the traffic light 10 in response to the hold time exceeding the predetermined hold time and/or the flow of traffic on the heavy traffic street has decreased, such that the traffic bottleneck (e.g., more than four cars) may not be occurring on the heavy traffic street. In other words, the at least one traffic signal controller 120 may adjust the traffic light 10 to from green to red on the heavy traffic street and/or keep the traffic light 10 red for a predetermined period of time in response to detecting the approach and/or waiting of a low number of the plurality of vehicles 20 at the road intersection using the at least one sensor 160, such as less than four cars.

Also, the processing unit 123 of the at least one traffic signal controller 120 executing the app may use the at least one sensor to count a number of the plurality of vehicles 20 moving toward, within, and/or away from the road intersection, such as any vehicle entering from a mall, a parking lot, and/or other points of entry on the heavy traffic street and/or any other street that could increase and/or decrease the count of the number of the plurality of vehicles 20. The processing unit 123 may store the count of the number of the plurality of vehicles 20 on the storage unit 125, as well as send the count of the number of the plurality of vehicles 20 to the storage device 110, the another at least one traffic signal controller 120, and/or the at least one traffic management device 130.

As such, the at least one traffic signal controller 120 may communicate to the another at least one traffic signal controller 120 to adjust the another traffic light 10 from red to green and/or keep the another traffic light 10 green for the another predetermined period of time to facilitate movement along the heavy traffic street. In other words, multiple intersections along the heavy traffic street that include traffic lights 10 may allow the plurality of cars 20 moving thereon to continue moving. Therefore, the at least one traffic signal controller 120 and/or the at least one traffic management device 130 may update the light signal of the traffic light 10 in real time, such that the plurality of vehicles 20 on the heavy traffic street may continue moving.

The at least one radar 170 may include bistatic radar, continuous radar, doppler radar, monopulse radar, passive radar, instrumentation radar, mapping radar, lidar, and navigational radar, but is not limited thereto.

Referring again to FIG. 2, the at least one radar 170 is illustrated to be disposed on at least a portion of the traffic light 10. However, the at least one radar 170 may be disposed at any location, such as on a street sign, a street light, on a drone, on a vehicle, a manhole cover, on a plant, and a telephone pole, to capture a range, an angle, and/or a velocity of the at least one vehicle 20 from the road intersection and/or on any street.

The at least one radar 170 may communicate with and/or be connected to the at least one traffic signal controller 120 and/or the at least one traffic management device 130. The at least one radar 170 may monitor the flow of traffic within and/or around the road intersection, such that the processing unit 123 of the at least one traffic signal controller 120 executing the app may determine the flow of traffic on the heavy traffic street. As such, preferably, the at least one radar 170 may be oriented in a direction, such as toward the heavy traffic street, the road intersection, and/or any other street to detect the at least one vehicle 20 therein, such that the processing unit 123 of the at least one traffic signal controller 120 executing the app may extend the duration of time of the at least one vehicle 20 on the heavy traffic street may move through the road intersection by keeping the traffic light 10 green. In other words, the processing unit 123 of the at least one traffic signal controller 120 executing the app may reduce a traffic bottleneck of the plurality of vehicles 20 on the heavy traffic street by facilitating movement through the road intersection in response to the at least one radar 170 monitoring and/or identifying the plurality of vehicles 20 approaching and/or moving through the road intersection.

Furthermore, the processing unit 123 of the at least one traffic signal controller 120 executing the app may calculate the hold time for the cross street based on the predetermined hold time in response to at least one other vehicle 20 approaching and/or waiting at the road intersection on the cross street. As such, the processing unit 123 of the at least one traffic signal controller 120 executing the app may change a light signal (e.g., from green light to red light) on the traffic light 10 in response to the hold time exceeding the predetermined hold time and/or the flow of traffic on the heavy traffic street has decreased, such that the traffic bottleneck (e.g., more than four cars) may not be occurring on the heavy traffic street. In other words, the at least one traffic signal controller 120 may adjust the traffic light 10 from green to red on the heavy traffic street and/or keep the traffic light 10 red for a predetermined period of time in response to detecting the approach and/or waiting of a low number of the plurality of vehicles 20 at the road intersection using the at least one radar 170, such as less than four cars.

Also, the processing unit 133 of the at least one traffic management device 130 may execute instructions from the app to display on the display unit 132 a report of the traffic data in response to receiving a report request from the input unit 131, such as the flow of traffic, a rate of congestion, accidents of any of the plurality of vehicles 20, errors and/or defects within the at least one traffic signal controller 120 and/or the storage device 110. Alternatively, the processing unit 133 of the at least one traffic management device 130 may execute instructions from the app to provide automated alerts on the display unit 132 of any of the above information.

Also, the processing unit 123 of the at least one traffic signal controller 120 executing the app may use the at least one radar 170 to count a number of the plurality of vehicles 20 moving toward, within, and/or away from the road intersection. The processing unit 123 may store the count of the number of the plurality of vehicles 20 on the storage unit 125, as well as send the count of the number of the plurality of vehicles 20 to the storage device 110, another at least one traffic signal controller 120, and/or the at least one traffic management device 130.

As such, the at least one traffic signal controller 120 may communicate to the another at least one traffic signal controller 120 to adjust the another traffic light 10 from red to green and/or keep the another traffic light 10 green for the another predetermined period of time to facilitate movement along the heavy traffic street. In other words, multiple intersections along the heavy traffic street that include traffic lights 10 may allow the plurality of cars 20 moving thereon to continue moving. Therefore, the at least one traffic signal controller 120 and/or the at least one traffic management device 130 may update the light signal of the traffic light 10 in real time, such that the plurality of vehicles 20 on the heavy traffic street may continue moving.

Also, the processing unit 123 of the at least one traffic signal controller 120 may execute instructions from the app to display on the display unit 122 the report and/or detected information similar to that listed above with respect to the at least one traffic management device 130. Furthermore, the communication unit 124 may receive the traffic data detected by the at least one camera 150, the at least one sensor 160, and/or the at least one radar 170.

The processing unit 123 of the at least one traffic signal controller 120 may execute instructions from the app to configure a message sign, a sprinkler, a pump, and a lane control from any device and/or apparatus disposed on and/or connected to the traffic light 10, such as a traffic sign.

Alternatively, and/or in addition to the at least one sensor 160 and/or the at least one radar 170 described above, other detectors may be used, such as sonar.

Therefore, the traffic signal control system 100 may reduce the traffic bottleneck due to the plurality of vehicles 20 waiting for the traffic light 10 at the road intersection.

The present general inventive concept may include a traffic signal control system 100 having a program running thereon to monitor and control operations of a traffic light 10 at a road intersection, the traffic signal control system 100 including a storage device 110 to store traffic data regarding a flow of traffic around the traffic light 10, at least one traffic signal controller 120 to execute the program to adjust a setting of the traffic light 10 based on the traffic data received from the storage device 110 for a heavy traffic street with a plurality of vehicles 20 thereon, such that the at least one traffic signal controller 120 performs at least one of adjusting a red light to a green light and keeping the green light for a predetermined period of time, and at least one traffic management device 130 to execute the program to manage the at least one traffic signal controller 120 and the traffic data received from the storage device 110.

The storage device 110 stores the traffic data to include at least one of traffic density, speed of the traffic, location of the at least one traffic signal controller 120, and operation status of the at least one traffic signal controller 120.

The traffic signal control system 100 may further include at least one camera 150 disposed on the traffic light 10 and connected to at least one of the storage device 110, the at least one traffic signal controller 120, and the at least one traffic management device 130 to monitor the flow of traffic within the road intersection.

The at least one camera 150 may be oriented in a direction of at least one street connected to the road intersection.

The at least one traffic signal controller 120 may extend the predetermined period of time in response to the at least one camera 150 identifying the plurality of vehicles 20 on the at least one street approaching the traffic light 10.

The at least one camera 150 may count a number of the plurality of vehicles 20 moving around the road intersection in real time.

The at least one traffic signal controller 120 may communicate to another at least one traffic signal controller 120 to adjust the setting of another traffic light 10 in response to the count of the number of the plurality of vehicles 20 from the at least one camera 150, such that the another at least one traffic signal controller 120 performs at least one of adjusting a red light to a green light and keeping the green light for another predetermined period of time.

The traffic signal control system 100 may further include at least one sensor 160 disposed on at least a portion of at least one street between the road intersection and another road intersection and connected to at least one of the storage device 110, the at least one traffic signal controller 120, and the at least one traffic management device 130 to monitor the flow of traffic within the road intersection.

The at least one traffic signal controller 120 may adjust the predetermined period of time in response to the at least one sensor 160 identifying the plurality of vehicles 20 on the at least one street waiting at the traffic light 10.

The at least one traffic sensor 160 may count a number of the plurality of vehicles 20 moving around the road intersection in real time.

The at least one traffic signal controller 120 may communicate to another at least one traffic signal controller 120 to adjust the setting of another traffic light 10 in response to the count of the number of the plurality of vehicles 20 from the at least one sensor 160, such that the another at least one traffic signal controller 120 performs at least one of adjusting a red light to a green light and keeping the green light for another predetermined period of time.

The traffic signal control system 100 may further include at least one radar 170 disposed on the traffic light 10 and connected to at least one of the storage device 110, the at least one traffic signal controller 120, and the at least one traffic management device 130 to monitor the flow of traffic within the road intersection.

The at least one radar 170 may be oriented in a direction of at least one street connected to the road intersection.

The at least one traffic signal controller 120 may extend the predetermined period of time in response to the at least one radar 170 identifying the plurality of vehicles 20 on the at least one street approaching the traffic light 20.

The at least one radar 170 may count a number of the plurality of vehicles 20 moving around the road intersection in real time.

The at least one traffic signal controller 120 may communicate to another at least one traffic signal controller 120 to adjust the setting of another traffic light 10 in response to the count of the number of the plurality of vehicles 20 from the at least one radar 170, such that the another at least one traffic signal controller 120 performs at least one of adjusting a red light to a green light and keeping the green light for another predetermined period of time.

The at least one traffic signal controller 120 may adjust the setting of the traffic light 10 in response to less than two vehicles being on a cross street.

The at least one traffic management device 130 may set up automated responses to the traffic data received from the at least one traffic signal controller 120.

The traffic management device 130 may set up at least one of the automated responses to increase the predetermined period of time the plurality of vehicles 20 on the heavy traffic street may move through the road intersection by adjusting the setting of the at least one traffic signal controller 120.

The at least one traffic signal controller 120 may adjust the setting of the traffic light 10 by adjusting the traffic light 10 from the green light to the red light in response to a low number of the plurality of vehicles 20 waiting on the heavy traffic street.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A traffic signal control system having a program running thereon to monitor and control operations of a traffic light at a road intersection, the traffic signal control system comprising:
   a storage device to store traffic data regarding a flow of traffic around the traffic light;
   at least one traffic signal controller to execute the program to adjust a setting of the traffic light based on the traffic data received from the storage device for a heavy traffic street with a plurality of vehicles thereon, such that the at least one traffic signal controller performs at least one of adjusting a red light to a green light and keeping the green light for a predetermined period of time, such that the at least one traffic signal controller calculates a hold time for a cross street based on a predetermined hold time in response to at least one other vehicle approaching the cross street and changes the green light to the red light in response to the hold time exceeding the predetermined hold time and an absence of a traffic bottleneck on the heavy traffic street, such that the at least one traffic signal controller determines that there is the traffic bottleneck when there are more than four vehicles on the heavy traffic street and an absence of communication to the at least one other vehicle; and
   at least one traffic management device to execute the program to manage the at least one traffic signal controller and the traffic data received from the storage device.

2. The traffic signal control system of claim 1, wherein the storage device stores the traffic data to include at least one of traffic density, speed of the traffic, location of the at least one traffic signal controller, and operation status of the at least one traffic signal controller.

3. The traffic signal control system of claim 1, further comprising:
   at least one camera disposed on the traffic light and connected to at least one of the storage device, the at least one traffic signal controller, and the at least one traffic management device to monitor the flow of traffic within the road intersection.

4. The traffic signal control system of claim 3, wherein the at least one camera is oriented in a direction of at least one street connected to the road intersection.

5. The traffic signal control system of claim 4, wherein the at least one traffic signal controller extends the predetermined period of time in response to the at least one camera identifying the plurality of vehicles on the at least one street approaching the traffic light.

6. The traffic signal control system of claim 3, wherein the at least one camera counts a number of the plurality of vehicles moving around the road intersection in real time.

7. The traffic signal control system of claim 6, wherein the at least one traffic signal controller communicates to another at least one traffic signal controller to adjust the setting of another traffic light in response to the count of the number of the plurality of vehicles from the at least one camera, such that the another at least one traffic signal controller performs at least one of adjusting a red light to a green light and keeping the green light for another predetermined period of time.

8. The traffic signal control system of claim 1, further comprising:
   at least one sensor disposed on at least a portion of at least one street between the road intersection and another road intersection and connected to at least one of the storage device, the at least one traffic signal controller, and the at least one traffic management device to monitor the flow of traffic within the road intersection.

9. The traffic signal control system of claim 8, wherein the at least one traffic signal controller adjusts the predetermined period of time in response to the at least one sensor identifying the plurality of vehicles on the at least one street waiting at the traffic light.

10. The traffic signal control system of claim 8, wherein the at least one traffic sensor counts a number of the plurality of vehicles moving around the road intersection in real time.

11. The traffic signal control system of claim 10, wherein the at least one traffic signal controller communicates to another at least one traffic signal controller to adjust the setting of another traffic light in response to the count of the number of the plurality of vehicles from the at least one sensor, such that the another at least one traffic signal controller performs at least one of adjusting a red light to a green light and keeping the green light for another predetermined period of time.

12. The traffic signal control system of claim 1, further comprising:
   at least one radar disposed on the traffic light and connected to at least one of the storage device, the at least one traffic signal controller, and the at least one traffic management device to monitor the flow of traffic within the road intersection.

13. The traffic signal control system of claim 12, wherein the at least one radar is oriented in a direction of at least one street connected to the road intersection.

14. The traffic signal control system of claim 13, wherein the at least one traffic signal controller extends the predetermined period of time in response to the at least one radar identifying the plurality of vehicles on the at least one street approaching the traffic light.

15. The traffic signal control system of claim 12, wherein the at least one radar counts a number of the plurality of vehicles moving around the road intersection in real time.

16. The traffic signal control system of claim 15, wherein the at least one traffic signal controller communicates to another at least one traffic signal controller to adjust the setting of another traffic light in response to the count of the number of the plurality of vehicles from the at least one radar, such that the another at least one traffic signal controller performs at least one of adjusting a red light to a green light and keeping the green light for another predetermined period of time.

17. The traffic signal control system of claim 1, wherein the at least one traffic signal controller adjusts the setting of the traffic light in response to less than two vehicles being on a cross street.

18. The traffic signal control system of claim 1, wherein the at least one traffic management device sets up automated responses to the traffic data received from the at least one traffic signal controller.

19. The traffic signal control system of claim 18, wherein the traffic management device sets up at least one of the automated responses to increase the predetermined period of time the plurality of vehicles on the heavy traffic street move through the road intersection by adjusting the setting of the at least one traffic signal controller.

20. The traffic signal control system of claim 1, wherein the at least one traffic signal controller adjusts the setting of the traffic light by adjusting the traffic light from the green light to the red light in response to a low number of the plurality of vehicles waiting on the heavy traffic street.

* * * * *